July 9, 1957    L. R. NELSON    2,798,745
MULTIPLE-TUBE HOSE COUPLING
Filed Feb. 23, 1954    2 Sheets-Sheet 1
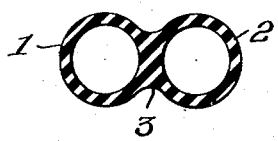
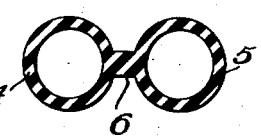
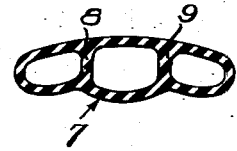
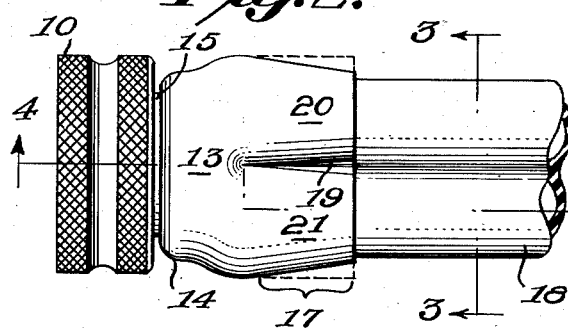
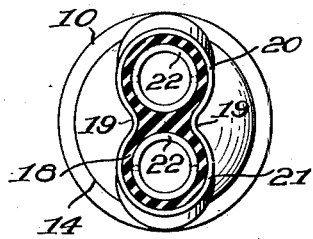
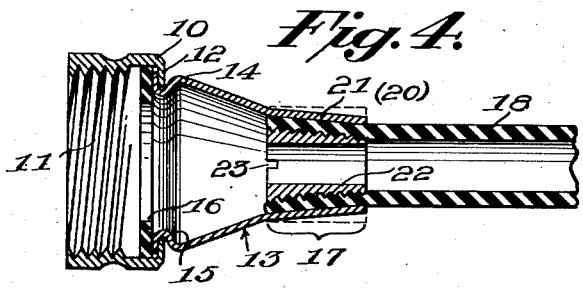
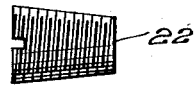
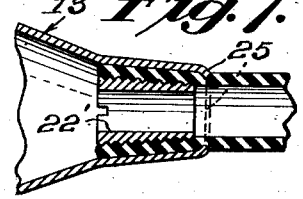
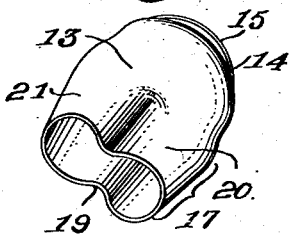
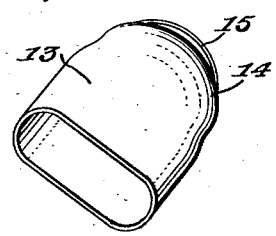
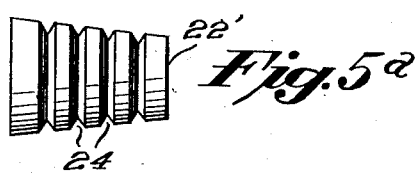
INVENTOR
Lewen R. Nelson
BY Stone, Boyden + Mack
ATTORNEYS July 9, 1957     L. R. NELSON     2,798,745
MULTIPLE-TUBE HOSE COUPLING
Filed Feb. 23, 1954                                    2 Sheets-Sheet 2

INVENTOR
Lewen R. Nelson
BY Stone, Boyden & Mack,
ATTORNEYS

United States Patent Office 2,798,745
Patented July 9, 1957

2,798,745

MULTIPLE-TUBE HOSE COUPLING

Lewen R. Nelson, Peoria, Ill.

Application February 23, 1954, Serial No. 411,923

3 Claims. (Cl. 285—155)

This invention relates to hose couplings and to methods for manufacturing such couplings and applying them to the hose. More particularly, the invention relates to couplings associated with a hose assembly comprising a plurality of tubular conduits arranged side-by-side, so that the hose assembly has a generally oblong cross-section. The tubular conduits may be independent of one another except as joined by the coupling, or they may be joined in parallel side-by-side relation to form an integral unit of the general type typified by the disclosure of United States Patent 2,621,075, issued December 9, 1952, to W. Sedar.

Such hoses are usually manufactured from rubber, synthetic rubber, or synthetic resinous materials by extrusion or like methods so that the material of the hose is compressible. As disclosed in the patent above referred to, multiple tube hoses are usually provided with spaced radially extending apertures and find extensive use for irrigation without involving additional spraying elements.

The invention provides a novel form of connector for hose assemblies of this type which allows the multiple tube hose assembly to be connected to a conventional silcock or other threaded device of circular cross-section. Thus, the couplings of the present invention provide a transition between the circular cross-section of the usual supply pipe and the generally oblong cross-section of the multiple tube hose assembly. A particular advantage of the invention is the provision of a coupling structure of the type referred to which clamps the conduit ends of the hose assembly under compression in such manner that the compressible material thereof is securely held against displacement when the hose assembly and coupling are in use. A further particular advantage of the invention is the provision of a novel hose connector structure, and a method for manufacturing the same and securing it to the hose, which is unusually simple and inexpensive.

In order that these and other advantages of the invention may be understood in detail, reference is had to the accompanying drawings which form a part of this specification and wherein:

Figs. 1–1b are transverse sectional views of typical multiple tube hoses to which the invention is applicable;

Fig. 2 is an elevational view of a coupling constructed in accordance with one embodiment of the invention and applied to a multiple tube hose;

Fig. 3 is a transverse sectional view taken on the line 3—3, Fig. 2;

Fig. 4 is a longitudinal sectional view taken on the line 4—4, Fig. 2;

Figs. 5 and 5a are elevational views of typical inserts employed in the embodiment of the invention illustrated in Fig. 2;

Figs. 6 and 6a are perspective views of ferrules employed in the device seen on Fig. 2;

Fig. 7 is a fragmentary longitudinal sectional view, similar to Fig. 4, showing a modified form of the invention;

Figure 8:
Figs. 8–11 illustrate a second form of the coupling of this invention and various successive steps in the production thereof.
Figure 8A:
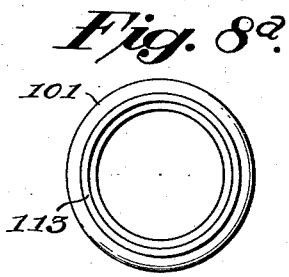

Referring to Fig. 1, it will be seen that one form of multiple tube or multiple conduit hose to which the invention is applicable comprises a pair of tubes 1 and 2 secured in side-by-side relation by a fillet of plastic material 3, the fillet and adjacent wall portions of the tubes providing a relatively thick compressible mass. Similarly, the hose of Fig. 1a comprises a pair of parallel tubes 4 and 5 joined by an integral web 6. In Fig. 1b, the multiple tube hose consists of an extruded body 7 of substantially oblong cross-sections, the interior thereof being divided into three tubular compartments by means of the partitions 8 and 9. These three constructions are typical illustrations of what is referred to hereinafter as an "integral multiple tube hose." It will be noted that all of the construction just referred to provide a hose the cross-section of which is generally oblong, so that the hose is not adapted for use with conventional cylindrical hose couplings.

Figs. 2–6 illustrate a typical hose coupling constructed in accordance with the present invention. This coupling comprises a conventional circular coupling nut 10 which is interiorly threaded at 11 and provided at one end with an inturned flange 12. A ferrule 13 is employed, this ferrule including a base portion 14 of circular cross-section joined to the coupling nut 10 by means of an annular inwardly directed groove 15 providing an end flange engaged behind the flange 12 of the coupling nut. The usual compressible sealing washer 16 is provided within the coupling nut 12 to engage the end flange of the ferrule.

While the cross-section of the ferrule 13 is circular at the base of the ferrule, the tip 17 or free end of the ferrule is of generally oblong cross-section, corresponding to the shape of the hose. The tip portion 17 extends for a material part of the length of the ferrule 13 and is provided with two diametrically opposed longitudinally extending indentations or depressions 19 dividing the tip portion 17 into two parallel sections 20 and 21 of generally circular cross-section.

The hose 18, in this case illustrated as of the type shown in Fig. 1, comprises two tubes, each tube having its end situated in a different one of the sections 20 and 21 of the tip portion 17 of the ferrule. As best seen in Fig. 4, there is positioned in the end of each tube of the hose 18 a rigid, tubular, tapered insert 22, the inserts being situated with their smaller ends inwardly of the hose. The inserts 22 have an outer diameter somewhat greater than the normal inner diameter of the tubes of the hose 18, the inserts being exteriorly threaded and arranged with their threads embedded in the compressible material of the hose. It wil be noted that the tip portion 17 of the ferrule 13 tapers from a larger cross-section in the body of the ferrule to a smaller cross-section at the free end of the ferrule. Similarly, the diametrically opposed longitudinally extending depressions 19 are deeper at the free end of the ferrule than they are in the body of the ferrule, so that the sections 20 and 21 are of tapered shape conforming to the shape of the inserts 22. The parallel sections 20 and 21 of the ferrule and the tapered inserts 22 thus provide opposed clamping surfaces between which the material of the hose is secured under compression. The inserts 22 are preferably provided with slots 23 to be engaged by a screwdriver or like tool for removal of the inserts, in order that the coupling may be removed from the hose by the purchaser if desired. As will be explained hereinafter with reference to Fig.

12, the inserts may be replaced, after removal, to reassemble the coupling.

While the embodiment of the invention shown in Figs. 2–4 employs a ferrule and a coupling nut initially formed as separate units and later joined together, the invention is equally adaptable to constructions, as in Figs. 9–10ª, wherein the threaded coupling member 110, a male coupling in this instance, and the ferrule 113 are fabricated from a single tubular sheet metal workpiece. In both cases, the ferrule portion tapers from a base portion of circular cross-section to a tip portion of generally oblong cross-section.

In general, I produce coupling structures in accordance with the method of the invention by providing a cylindrical ferrule piece, preliminarily flattening one end portion of the ferrule piece to form a tip portion of generally oblong cross-section, which flattened portion extends for a material part of the length of the ferrule piece, and finally forming the tip portion into a plurality of parallel longitudinally extending generally frustoconical sections each adapted to embrace the end of one tubular conduit of the hose assembly.

Figure 9:
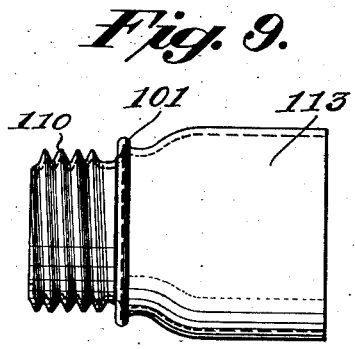
Figure 9A:
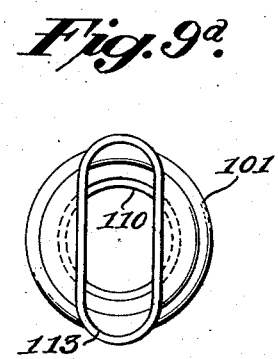

Thus, in producing a one-piece unit of the type seen in Figs. 8–11, I start with a tubular work piece 100, Fig. 8, including a coupling portion 110, of smaller diameter, and a ferrule portion 113 of larger diameter. I may produce such a work piece by punching through the bottom of a cup-shaped sheet metal blank, or by reducing in a die one end of a cylindrical tubular blank. I then upset the work piece to provide an outwardly directly transverse annular flange 101 situated between the coupling portion and the ferrule portion and constituting the sole means for joining said portions one to the other. Threads are then rolled on the coupling portion 110 as seen in Fig. 9, in this instance providing a male coupler for engagement with a coupling nut such as the nut 10, Fig. 4, I then preliminarily flatten the free end of the ferrule portion 113 to provide a tip portion 117 of generally oblong cross-section, as seen in Figs. 9 and 9ª, such tip portion extending for a major part of the length of the ferrule. This preliminarily flattened tip portion is then secured to the end of the hose assembly as will be described with reference to Fig. 11.

Figure 10:
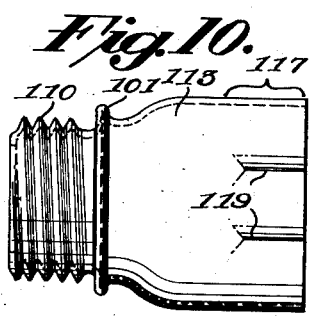
Figure 10A:
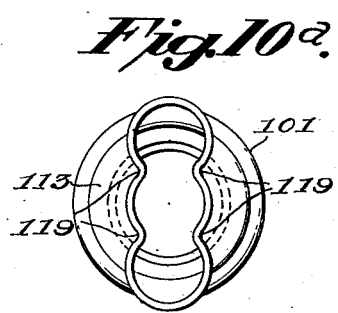

Instead of preliminarily flattening the free end of the ferrule portion 113 to the simple oblong cross-section seen in Figs. 9 and 9ª, I may provide by the preliminary flattening step a plurality of longitudinally extending depressions 119 arranged in diametrically opposed pairs as seen in Figs. 10 and 10ª. The depressions 119 divide the tip of the ferrule portion into a plurality of parallel sections of partially circular cross-section to receive the ends of the conduits of the hose assembly preparatory to final shaping of the sections into clamping relation with the hose in which the sections approach more closely a completely circular cross-section to apply radial pressure to the hose material substantially uniformly around the cylindrical inserts. At this stage, the major surfaces of the tip portion of the ferrule have a regular hill-and-valley configuration as seen in Fig. 10ª, for a 3-tube hose, and in Fig. 2, for a 2-tube hose. In each case, the parallel sections of the ferrule tip portion are generally cylindrical and substantially untapered, as is readily apparent in Fig. 10 and from the dotted lines in Fig. 2. It is preferred that the preliminarily flattened tip portion be of such dimension that the end of the hose to which the coupling is to be attached will fit snugly therein, with the end of each tube of the hose situated in a different one of said parallel sections.

It will be obvious that the female coupling of Figs. 2–4 may be produced by the method just outlined, the only variation required being the formation of groove 15, Fig. 4, to secure the coupling nut 10, rather than forming the flange 101 and the male coupling portion 110, Figs. 8–10.

The final shaping operation performed on the ferrule tip portion 17 and 117 may be the same, regardless of whether or not the coupling portion is made from the same work piece as the ferrule portion.

Figure 11:
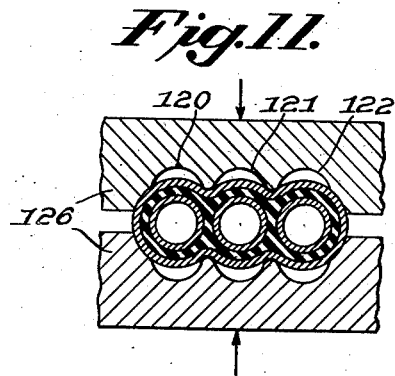

The preliminarily shaped ferrule may now be fixed to the hose end in accordance with the invention by a transverse pressing operation, as illustrated in Fig. 11. The inserts, such as insert 22, Fig. 5, are first placed each in the end of one of the tubes of the hose and the hose end then positioned within the preliminarily flattened tip portion of the ferrule, with the hose end inserted sufficiently far into the ferrule that the inner ends of the inserts are substantially in the plane defined by the ferrule tip. This assembly is then positioned between die members 126 each having concavities 120, 121, 123. These concavities are of tapered form, corresponding in shape to that of the inserts in the tube ends, and are of such dimensions that the fully closed die cavity will not accommodate the coupling structure without a marked compression of the material of the hose. Accordingly, closing of the dies results in deformation of the tip portion of the ferrule of such nature that said portion is made to conform to the shape of the inserts. Since the inserts are tapered, each of the resulting depressions or indentations 19, Fig. 2, or 119, Figs. 10 and 10ª, are made deeper at the ferrule tip than in the body of the ferrule. By this procedure, the compressible material of the hose body is securely clamped between the tip portion of the ferrule and the inserts within the hose with the exterior threads in the compressible material of the hose.

In this connection, it should be noted that each of the typical hose constructions seen in Figs. 1–1ᵇ provides between adjacent tubes of the hose an excess of compressible material in the sense that the mass between the tubes is markedly thicker than the normal walls of the hose. Thus, see fillet 3, Fig. 1, web 6, Fig. 1ª, and partitions 8 and 9, Fig. 1ᵇ. It has been found that presence of this excess of compressible material aids very materially the clamping action above referred to. Thus, it will be seen that the tip or deeper portions of the longitudinal depressions 19, Fig. 2, and 119, Fig. 10ª, project deep into this relatively thicker mass of hose material, causing considerable "flow" of the excess material in the clamping action.

Another procedure in accordance with the invention will now be described with reference to Fig. 12. Here, the ferrule 13 is worked to final shape, so that the tip portion of the ferrule comprises a plurality of parallel generally frusto-conical sections tapering toward the tip of the ferrule. The hose end, without inserts, is then positioned in the ferrule tip portion with each of the tubes of the hose situated in a different one of said frusto-conical sections. The inserts 22 are then forced part of the way into the tubes and threaded to their final position (which is that seen in Fig. 7, for example) by means of a screwdriver or like tool 137. In this embodiment of the method, compression of the hose material is effected by reason of the entrance of the tapered inserts into the tube ends of the hose. This procedure is particularly useful when so-called "plastic" hoses, such as those fabricated from the various vinyl materials, are employed, the material of such hoses being sufficiently firm to allow positive threading of the inserts into the tubes. This procedure is particularly well adapted to assembly of couplings on a 2-tube hose, since it is more convenient with such a hose to reach the inserts by inserting a tool through the circular coupling member.

In the method just described with reference to Fig. 12, it should be noted that the ferrule is formed to final shape before the hose is inserted, and the clamping action results entirely from insertion of the inserts. It will be understood that conventional forming dies, such as illustrated in Fig. 11, may be used to finally shape the ferrule.

Figure 12:
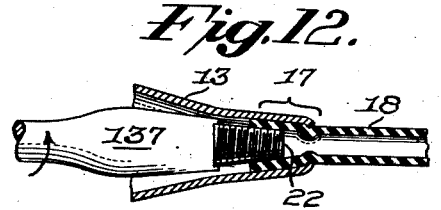
Fig. 12 is a fragmentary longitudinal sectional view, somewhat enlarged, with respect to the other figures, illustrating yet another method for securing a hose coupling of the invention to the hose.

Whether the method of Figs. 9–11 or that of Fig. 12 is employed, the inserts may be removed and replaced by means of the tool 137, assuming that they are of the type shown in Fig. 5. Thus, the purchaser is able to repair the coupling with simple tools.

I prefer to make the ferrule 13 from sheet metal, employing sequential forming steps in the general manner exemplified by Figs. 8–11. It will be understood, however, that the ferrule may be made by other procedures, such as die casting, if desired. When the inserts 22 are screwed into the hose end in the manner seen in Fig. 12, the ferrule may be completely rigid.

For purposes of simplicity, the invention has been described with reference to an integral multiple tube hose. However, the invention is also applicable to hose assemblies including a plurality of separate tubular conduits held in assembled relation by the coupling. Thus, the invention is particularly well adapted to production of sprinkler hose assemblies of the type described and claimed in my copending application, Serial Number 419,687, filed March 30, 1945, now Patent No. 2,746,799, issued May 22, 1956.

I claim:

1. In a device of the type described, the combination of an integral hose fabricated of compressible material and comprising a plurality of parallel tubes, adjacent ones of said tubes being joined in such manner that the hose has a generally oblong overall cross-sestion with portions of the hose at the junction of the tubes being materially thicker than the walls of the tubes, a plurality of rigid tapered tubular inserts disposed each small end inwardly in the end portion of a different one of said tubes, said inserts being larger than the inner diameters of the respective tubes in which they are disposed so that said tube end portions are outwardly flared, and a coupling including a ferrule having at one end a portion of circular cross-section and at the other end a hose-embracing portion of generally oblong cross-section, said hose-embracing portion being provided with a plurality of opposed longitudinally extending inwardly directed portions dividing said hose-embracing end portion into a plurality of clamping portions of generally circular cross-section each tapering toward the free end of said hose-embracing portion and each embracing the flared end portion of a different one of said tubes, said inwardly directed portions being embedded in said materially thicker portions of the hose, the generally annular spaces between said inserts and the corresponding clamping portions being smaller in cross-section than are the tubes positioned therebetween and said conduits thus being clamped under compression between said inserts and clamping portions with said hose-embracing portion of said ferrule sealingly embracing said end portions of said tubes and the thicker portions of the hose at the junctions of the tube end portions.

2. In a device of the type described, the combination of an integral multiple-tube hose comprising a plurality of parallel, substantially non-tapering tubes joined one to the other in side-by-side relation, said hose being fabricated of compressible material; a plurality of rigid, tapered, tubular inserts each disposed small end inwardly in the end portion of a different one of the tubes of said hose, said inserts being larger than the inner diameters of the respective tubes in which they are disposed so that said end portions of the tubes are caused to flare outwardly; and a coupling including a ferrule having at one end a portion of circular cross-section and at the other end a hose-embracing portion of generally oblong cross-section, said latter portion of the ferrule sealingly embracing the end of said hose containing said inserts and comprising a plurality of parallel, longitudinally extending clamping portions of generally circular cross-section each tapering toward the free end of the hose-embracing portion of the ferrule and each embracing the flared end portion of a different one of said tubes, the generally annular spaces between said inserts and the corresponding clamping portions of said ferrule being smaller in cross-section than are the tubes positioned therebetween and the end of the hose thus being clamped under compression between said inserts and clamping portions.

3. In combination, an integral multiple-tube hose fabricated of compressible material and comprising a plurality of parallel tubes joined side-by-side, a plurality of rigid, tapered, tubular inserts disposed each small end inwardly in the end portion of a different one of said tubes, and a coupling including a ferrule having at one end a portion of generally circular cross-section and at the other end a hose-embracing portion of generally oblong cross-section, said hose-embracing portion including a plurality of clamping portions of generally circular cross-section each tapering toward the free end of said hose-embracing portion of the ferrule and each embracing the insert-containing end portion of a different one of said tubes, adjacent ones of said clamping portions joining each other in opposed, inwardly directed, longitudinally extending portions, the generally annular spaces between said inserts and the corresponding clamping portions of the ferrule being smaller in cross-section than are the tubes positioned therein and the end of the tubes thus being clamped under compression between said inserts and clamping portions with the thickness of the hose material between said inserts in said generally annular spaces thus being less than the normal thickness of the walls of said tubes by reason of such compression, the spaces between adjacent ones of said inserts being completely filled by masses of hose material substantially thicker than the normal thickness of the walls of said tubes and with said opposed, inwardly directed, longitudinally extending portions of said hose-embracing portion of the ferrule being embedded in said masses of hose material, whereby said ferrule sealingly embraces said end portions of the tubes of the hose and the thicker masses of hose material disposed between said inserts.

References Cited in the file of this patent

UNITED STATES PATENTS

| | | |
|---|---|---|
| 454,647 | Hallas | June 23, 1891 |
| 884,326 | Emery | Apr. 7, 1908 |
| 1,295,304 | Grindle | Feb. 25, 1919 |
| 1,417,396 | Lassiter | May 23, 1922 |
| 1,830,229 | Gray | Nov. 3, 1931 |
| 2,086,654 | Winder | July 13, 1937 |
| 2,216,686 | Fentress | Oct. 1, 1940 |
| 2,305,992 | Quillen | Dec. 22, 1942 |
| 2,321,991 | Butler | June 15, 1943 |
| 2,538,916 | Rudolph | Jan. 23, 1951 |